United States Patent [19]
Wickham et al.

[11] 3,799,498
[45] Mar. 26, 1974

[54] VALVE MEANS

[75] Inventors: David John Wickham; John Lewis Hall, both of London, England

[73] Assignee: Westinghouse Brake and Signal Company Limited, London, England

[22] Filed: Feb. 7, 1972

[21] Appl. No.: 224,057

[30] Foreign Application Priority Data
Mar. 5, 1971   Great Britain...................... 6098/71

[52] U.S. Cl................ 251/129, 137/82, 137/627.5, 137/84, 137/85, 251/77, 251/47
[51] Int. Cl..... G05d 16/00, F15b 5/00, F16k 31/10
[58] Field of Search ..... 137/625.61, 82, 84, 625.64, 137/85, 627.5; 251/77, 47, 129

[56] References Cited
UNITED STATES PATENTS

| | | |
|---|---|---|
| 2,844,158 | 7/1958 | Carson................................ 137/82 |
| 3,621,862 | 11/1971 | Wojtecki.............................. 137/82 |
| 3,004,546 | 10/1961 | Robins et al.......................... 137/82 |
| 3,613,717 | 10/1971 | Smith.......................... 137/625.64 X |
| 3,263,702 | 8/1966 | Pullen et al.................... 137/625.64 |

*Primary Examiner*—Arnold Rosenthal
*Attorney, Agent, or Firm*—Larson, Taylor and Hines

[57] ABSTRACT

An electro-pneumatic converter of the type in which the pneumatic output signal is derived from the back-pressure at a throttled exhaust port variation of throttling of which is effected by varying the value of the electrical signal applied to an electromagnetic system. In such a converter movement of the electro-magnetic system is damped and the system is coupled to the throttling element via a spring.

11 Claims, 1 Drawing Figure

PATENTED MAR 26 1974 3,799,498
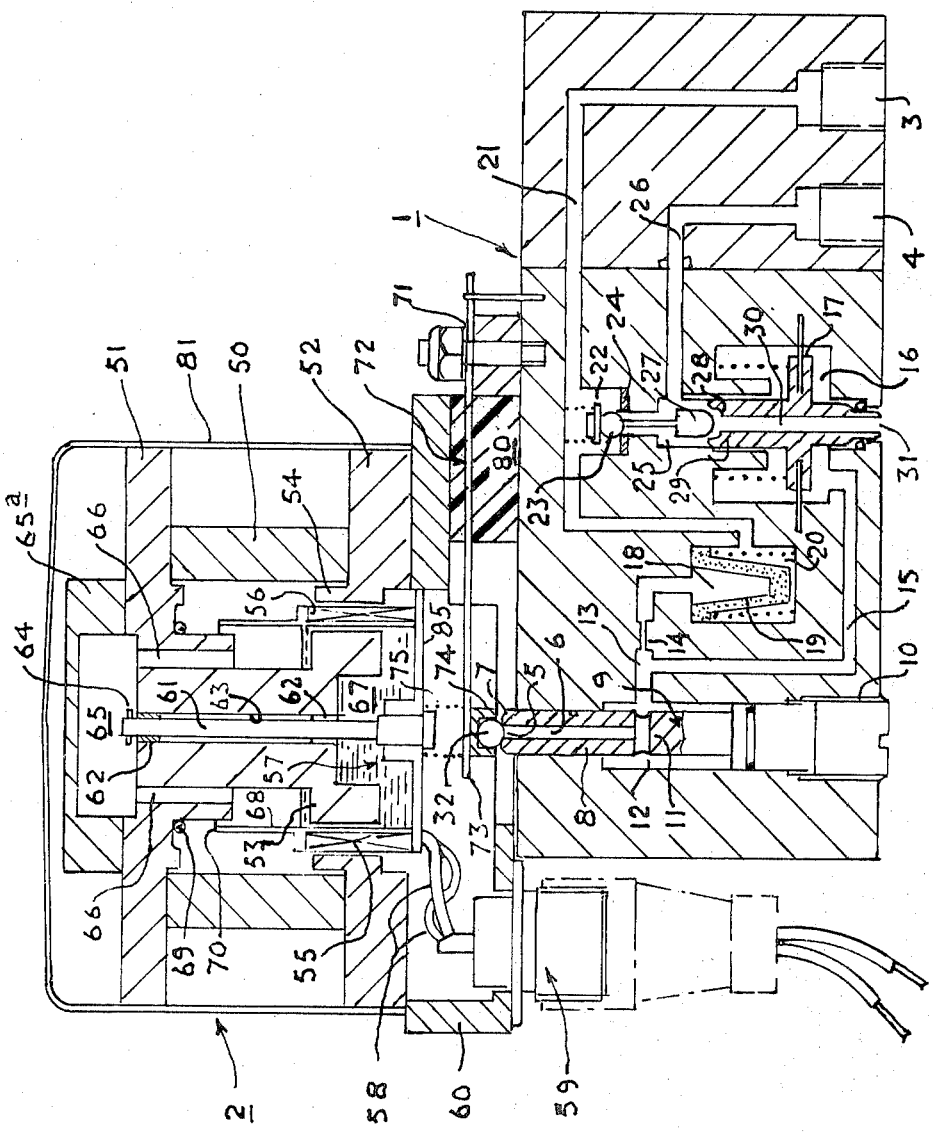

VALVE MEANS

This invention relates to valve means.

The present invention provides valve which includes a first means having a control part which is movable throughout a range of operational movement, said part being movable upon variation of an applied signal; damping means effective in operation of the valve means to damp vibrational movement of said part to a relatively small proportion of the range of operational movement of said part; resilient means to which is applicable motion of said part and which is effective to translate said motion into an output force the value of which varies with such motion; and valve closure means movable throughout a range of operational movement thereof relative to a valve seat variably to throttle escape of fluid from the valve seat and to which the resilient means applies said output force to act against the force exerted on the member in opposition thereto by the pressure of the escaping fluid, the range of operational movement of the valve closure member being relatively small as compared to the range of operational movement of said part.

The first means may be electro-magnetic means which may comprise a fixed magnet and a co-operating electromagnetic coil which coil constitutes said part of the first means and the applied signal constitutes an electric-signal to energise the electro-magnetic coil.

The resilient means may comprise a compression spring located between said part and the valve closure member. The valve closure member may be located at one end of a leaf-spring cantilever-mounted by its opposite end. When the resilient means comprises a compression spring as above-described, one end of the compression spring may abut said part of the first means and the opposite end may abut said one end of the leaf-spring.

The valve closure member may be a ball.

The valve means may have a fluid-pressure input port, a fluid-pressure output port and an exhaust port, the input port being connected to a source of fluid-pressure and the exhaust port being the valve seat.

The damping means may be a piston-and-cylinder arrangement, transference of fluid from one side of the piston to the other being throttled. The throttling may be effected by restricted clearance between the piston and the internal wall of the cylinder. When said part is an electro-magnetic coil as above-described, the coil may be wound on the cylinder and, in this case, the piston may be a pole-piece of the permanent magnet. The piston may be open at one end and be movable to a position outside its range of operational movement there to seat on a seal which closes said one end of the cylinder.

One embodiment of the present invention will now be described in greater detail, by way of example only, with reference to the accompanying drawing which shows a cross-sectional view of the valve means.

Referring to the drawing, the valve means comprises a valve body 1 and a control portion 2.

The valve body 1 comprises a fluid-pressure input port 3, a fluid-pressure output port 4 and an exhaust port 5 constituting one end of a bore 6 and encircled by a valve seat 7.

The bore 6 extends through a tubular extension 8 of a member 9 threadedly engaged in the valve body 1 at 10 so that rotation of the member 9 axially moves upwardly or downwardly (in accordance with the direction of rotation of the member 9) to lift or lower as the case may be the valve seat 7. In the member 9 and communicating with the bore 6 is a transverse conduit 11 which interconnects the bore 6 with a chamber 12. Extending from the chamber 12 is a conduit 13 having therein a choke 14 and branching from which is another conduit 15 leading to a chamber 16 on the underside of a diaphragm 17.

The conduit 13 leads to a chamber 18 on one side of a filter element 19 which separates the chamber 18 from a further chamber 20. Communicating with the chamber 20 is a conduit 21 serving to interconnect the input port 3 with the chamber 20.

Branching-off the conduit 21 is a chamber 22 in which is a valve element 23 engagable with a valve seat 24 separating the chamber 22 from a chamber 25 which latter chamber is in communication with the output port 4 through a conduit 26.

The valve element 23 is mechanically interconnected with a second valve element 27 co-operable with a valve seat 28 at the upper end of a tubular extension 29 carried by the diaphragm 17 and through which extends a bore open to atmosphere at its lower end 31.

Co-operable with the valve seat 7 is a valve closure member in the form of a ball 32.

The valve means as so far described operate in the following manner:

With the input port 3 connected to a source of fluid-pressure, fluid pressure from the source will flow from the input port 3 through the conduit 21 to the chamber 20 from whence it will flow through the filter 19 into the chamber 18 and through the conduit 13 incorporating the choke 14. From the conduit 13, the fluid-pressure will be applied to the chamber 12 and, through the conduit 11 and the bore 6 will be presented at the exhaust port 5.

Depending upon the degree of throttling of the exhaust port 5 by the ball 32 being variably spaced from the valve seat 7, the fluid-pressure appearing at the exhaust port 5 will to a greater or lesser extent escape through the valve seat 7. As a result, the pressure in the chamber 12 will drop to a value dependent upon the degree of throttling of the valve seat 7 by the ball 32 and this pressure will be applied over conduit 15 to the chamber 16 beneath the diaphragm 17. The diaphragm 17 will, therefore, be subjected to an upwardly-directed force the value of which will be dependent upon the degree of escape of fluid-pressure through the valve seat 7. This upwardly directed force on the diaphragm 17 will lift the tubular portion 29 to engage the valve seat 28 with the valve element 27 and thereby lift also the valve element 23 out of engagement with the valve seat 24. Hence, fluid-pressure present in the conduit 21 will flow through the valve seat 24 to the chamber 25 and thence, via conduit 26, to the outlet port 4. Fluid-pressure will, therefore, build-up in the chamber 25 to exert on the upper end of the tubular extension 29 a downwardly-directed force to oppose the upwardly-directed force exerted on the underside of the diaphragm 17 due to the pressure in the chamber 16. At some point, these two opposed forces will balance each other so that the valve constituted by the valve member 23, the valve seat 24, the valve member 27 and the valve seat 28 will settle in a "lap" position in which both of the valve seats 24 and 28 are closed respectively by their valve elements 23 and 27. Should the chamber 25 become overpressurised, the downwardly-directed force exerted by the pressure in the chamber 25 will overcome the upwardly directed force due to the pressure in the chamber 16 so that the diaphragm 17 will thus be moved downwardly. In this event, the valve element 23 will be retained in engagement with its valve seat 24 but the valve seat 28 will be moved downwardly out of engagement with the valve element 27 thus opening the chamber 25 to communication with the conduit 30 and, thence to atmosphere at the open end 31 of the conduit 30. As a result, fluid-pressure in the chamber 25 will escape to atmosphere through 31 thus reducing the pressure in the chamber 25 again until a stage is reached at which the pressure in the chamber 25 exerts on the diaphragm 17 a downwardly-directed force which equals the upwardly-directed force exerted by the pressure in chamber 16. In this situation, the valves will again reach their lap position.

It will thus be seen that the pressure appearing at the outlet port 4 (for any given input pressure at the input port 3) will be dependent upon the degree of escape of fluid pressure through the valve seat 7.

Turning now to the control means 2, this control means comprises an annular permanent magnet 50 clamped between upper and lower plates 51 and 52 respectively. Each of the plates 51 and 52 provide a pole piece; the plate 51 providing an internal pole piece 53 and the plate 52 providing an external pole piece 54. Positioned between the pole pieces 53 and 54 is an electro-magnetic coil 55 wound in an annular channel 56 on a cylinder 57 within which is positioned the pole piece 53 which thus constitutes a piston in the cylinder 57. Relative motion between cylinder 57 and piston 53 is provided by virtue of the fact that piston 53 is fixed relative to the value frame while cylinder 57 with its end plate 85 is movable vertically via the connection between plate 85 and rod 61. The electro-magnetic coil 55 is arranged to be energised by the passage therethrough of an applied signal in the form of a current over leads 58 which pass out through a plug and socket arrangement 59 carried by a base plate 60 by which the control means 2 is secured to the valve body 1.

The cylinder 57 with its end plate 85 is guided for movement by a rod 61 slidable in bearings 62 in a bore 63 in the pole piece 53 and is provided at its upper end with a circlip 64. The upper end of the rod 61 projects into a chamber 65 formed within the upper plate 51 and a cover 65a secured to that plate 51. Providing communication between the chamber 65 and the interior of the cylinder 57 is a plurality of conduits 66.

The cylinder 57 is partially filled with a relatively viscous fluid 67 and the cylinder 57 is provided at its upper end with a skirt 68. Adjacent the plate 51 is an O-ring 69 with which is engagable the upper extremity 70 of the skirt 68.

Mounted on the base 60 by one end 71 is a cantilever-mounted leaf-spring 72 the free end 73 of which has adjacent thereto an inverted cup-shaped button 74 which serves loosely to locate the ball 32.

Extending between the leaf-spring 72 positioned on the opposite side thereof from the button 74 is a resilient means in the form of a compression coil spring 75 which extends between the leaf-spring 72 and the cylinder 5.

The control means operates as follows:

The permanent magnet 50 will generate between its pole pieces 53 and 54 a magnetic field in which lies the coil 55. By the application to the coil 55 of an electric signal in the form of an electric current fed to the coil through the plug and socket 59 and the leads 58, a control part formed by the coil 55 will be caused to move with a downward motion through part of a range of operational movement in that magnetic field to generate a force which is applied to the upper end of the spring 75 thus causing that upper end to be moved downwardly. Such downward movement of the upper end of the coil spring 75 compresses the spring 75 to cause it to exert adjacent the free end 73 of the leaf-spring 72 a force which will be dependent upon the force generated on the cylinder 57 as a result of the energisation of the coil 55 and this downwardly-directed force will be applied through the button 74 to the ball 32.

In operation of the valve, therefore, the ball 32 will be subjected to a downwardly-directed force arising from energisation of the coil 55 and the value of which will be dependent upon the value of the current passed through the coil 55 and will also be subjected to an upwardly-directed force generated by the pressure of the fluid escaping through the valve seat 7. Hence, the ball 32 will take up a position in its own range of operational movement relative to its seat 7 which is determined by the balancing of these forces and will result in a degree of throttling of the valve seat 7 which is dependent upon the degree of energisation of the coil 55.

From the above descriptions of the operations of the parts in the valve body 1 and the parts in the control means 2, that the pressure at the outlet port 4 (for any given value of pressure at the input port 3) will be dependent upon the value of the current passed through the coil 55.

In the above description, the resilient forces exerted by the leaf-spring 72 have been ignored but these will, of course, add or subtract to a minor degree from the forces exerted by the electro-magnetic means constituted by the permanent magnet 50 and the electro-magnetic coil 55.

Under conditions of vibration, the effect of such vibration is minimized by, on the one hand, the fluid 67 in the cylinder 57 acting as a damping means to damp vibrational oscillation of the cylinder 57 to a minimum and, on the other hand, by the provision of the coil spring 75. By the provision of the coil spring 75 any such residual vibration as there may be of the cylinder 57 will be transmitted to the free end 73 of the leaf-spring 72 as a force vibration rather than (as would be the case if the cylinder 57 were directly connected to adjacent the free end 73 of the leaf-spring 72) as a direct mechanical movement. Hence, such oscillatory variation of the force applied to the ball 32 as does occur will oscillate about the mean position which has previously been determined by the degree of energisation of the electro-magnetic coil 55 so that such vibration will not affect that mean condition.

In order to allow the escape of fluid which flows through the valve seat 7, there is provided a mass 80 of porous foam plastic through which such fluid flow can escape to atmosphere.

The internal parts of the control means 2 are enclosed within a second cover 81.

For the purposes of transportation of the valve means, the second cover 81 and the cover 65a is removed and the rod 61 pulled upwardly until the upper end 70 of the skirt 68 seats on the O-ring 69. A "hairpin" type of spring is then inserted between the upper face of the plate 51 and the circlip 64 to retain the cylinder 57 in its position in which the upper end 70 of the skirt 68 is sealed against the O-ring 69. The covers 65a and 81 are then replaced. It will now be seen that the fluid 67 is trapped within the volume provided by the interior of the cylinder 57, the conduits 66 and the chamber 65.

The null position of the valve means can be set by rotation of the member 9 in the valve body 1.

Having thus described our invention, what we claim is:

1. A valve which includes an electro-magnetic means having a control part which is movable throughout a range of operational movement, means for creating an applied signal, said control part being movable upon variation of said applied signal; damping means effective in operation of the valve to damp vibrational movement of said control part to a relatively small proportion of the range of operational movement of said control part; resilient means to which is applicable motion of said control part for translating said motion into an output force, the value of which force varies with such motion; and a valve closure member movable throughout a range of operational movement thereof relative to a valve seat variably to throttle escape of fluid from the valve seat, and to which member the said resilient means applies said output force to act against the force exerted on the closure member in opposition thereto by the pressure of the escaping fluid, the range of operational movement of the valve closure member being relatively small as compared to the range of operational movement of said control part.

2. A valve as claimed in claim 1, wherein the electro-magnetic means comprises a fixed magnet and a cooperating electro-magnetic coil which constitutes said control part of the first means, and wherein the applied signal constitutes an electric-signal to energise the electro-magnetic coil.

3. A valve as claimed in claim 1, wherein the resilient means comprises a compression spring located between said control part and the valve closure member.

4. A value as claimed in claim 1, wherein the valve closure element is a ball.

5. A valve as claimed in claim 1, wherein the valve has a fluid-pressure input port, a fluid-pressure output port and an exhaust port, the input port being connected to a source of fluid-pressure and the exhaust port being the valve seat.

6. A valve which includes a first means having a control part which is movable throughout a range of operational movement, means for creating an applied signal, said control part being movable upon variation of said applied signal; damping means effective in operation of the valve to damp vibrational movement of said control part to a relatively small proportion of the range of operational movement of said control part; resilient means to which is applicable motion of said control part for translating said motion into an output force, the value of which force varies with such motion; and a valve closure member located at one end of a leaf-spring cantilever-mounted by its opposite end, said valve closure member being movable throughout a range of operational movement thereof relative to a valve seat variably to throttle escape of fluid from the valve seat, said resilient means comprising a compression spring located between the said control part and the valve closure member and applying said output force to the valve closure member to act against the force exerted on the closure member in opposition thereto by the pressure of the escaping fluid, the range of operational movement of the valve closure member being relatively small as compared to the range of operational movement of said control part.

7. A valve as claimed in claim 6, wherein one end of the compression spring abuts said control part of the first means and the opposite end abuts said one end of the leaf-spring.

8. A valve which includes a first means having a control part which is movable throughout a range of operational movement, means for creating an applied signal, said control part being movable upon variation of said applied signal; damping means effective in operation of the valve to damp vibrational movement of said control part to a relatively small proportion of the range of operational movement of said control part, said damping means being a piston and cylinder arrangement, transference of fluid from one side of the piston to the other side being throttled; resilient means to which is applicable motion of said control part for translating said motion into an output force, the value of which force varies with such motion; and a valve closure member movable throughout a range of operational movement thereof relative to a valve seat variably to throttle escape of fluid from the valve seat, and to which member the same resilient means applies said output force to act against the force exerted on the closure member in opposition thereto by the prssure of the escaping fluid, the range of operational movement of the valve closure member being relatively small as compared to the range of operational movement of said control part.

9. A valve means as claimed in claim 8, wherein the throttling is effected by restricted clearance between the piston and the internal wall of the cylinder.

10. A valve as claimed in claim 9, wherein the first means is an electro-magnetic means and wherein the coil is wound on the cylinder and the piston is a pole-piece of the permanent magnet.

11. A valve as claimed in claim 8, wherein the cylinder is open at one end and is movable to a position outside its range of operational movement to seat on a seal which closes said one end of the cylinder.

* * * * *